US012707517B2

(12) United States Patent
Wu

(10) Patent No.: US 12,707,517 B2
(45) Date of Patent: Aug. 11, 2026

(54) TRANSMISSION TUNNEL CHANGING METHOD, ACCESS NETWORK DEVICE, AND CORE NETWORK DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 665 days.

(21) Appl. No.: 17/955,514

(22) Filed: Sep. 28, 2022

(65) Prior Publication Data

US 2023/0020573 A1 Jan. 19, 2023

Related U.S. Application Data

(63) Continuation of application No. PCT/CN2021/085256, filed on Apr. 2, 2021.

(30) Foreign Application Priority Data

Apr. 3, 2020 (CN) ......................... 202010260659.6

(51) Int. Cl.
*H04W 76/15* (2018.01)
*H04W 76/20* (2018.01)

(52) U.S. Cl.
CPC ........... *H04W 76/15* (2018.02); *H04W 76/20* (2018.02)

(58) Field of Classification Search
CPC ..... H04W 76/15; H04W 76/20; H04W 36/06; H04W 76/11; H04W 92/045; H04W 36/0007; H04W 76/22; H04W 4/06
See application file for complete search history.

(56) References Cited

U.S. PATENT DOCUMENTS 12,225,434 B2 * 2/2025 Baek .................... H04W 76/40
2015/0334606 A1 11/2015 Sun et al.
(Continued)

FOREIGN PATENT DOCUMENTS

CN 101567905 A 10/2009
CN 101656869 A 2/2010
(Continued)

OTHER PUBLICATIONS

International Search Report issued in corresponding International Application No. PCT/CN2021/085256, mailed Jul. 5, 2021, 4 pages.
(Continued)

*Primary Examiner* — Wei Zhao
*Assistant Examiner* — Nhu Pham
(74) *Attorney, Agent, or Firm* — IPX PLLC

(57) ABSTRACT

A transmission tunnel changing method, an access network device, and a core network device are provided. The transmission tunnel changing method is performed by a base station, and the method includes: establishing multiple transmission tunnels for one target service; receiving data of the target service by using a source transmission tunnel, where the source transmission tunnel is one of the multiple transmission tunnels; receiving a transmission tunnel change instruction, where the transmission tunnel change instruction is used to instruct to change data transmission of the target service from the source transmission tunnel to a target transmission tunnel, and the target transmission tunnel is one of the multiple transmission tunnels; and receiving the data of the target service from the target transmission tunnel.

20 Claims, 6 Drawing Sheets

(56) References Cited

U.S. PATENT DOCUMENTS

| | | | | |
|---|---|---|---|---|
| 2017/0251514 | A1 | 8/2017 | Soderlund et al. | |
| 2019/0208555 | A1 | 7/2019 | Zee et al. | |
| 2020/0037381 | A1 | 1/2020 | Ross et al. | |
| 2020/0053815 | A1 | 2/2020 | Teyeb et al. | |
| 2023/0082017 | A1* | 3/2023 | Hong | H04W 76/22<br>370/312 |

FOREIGN PATENT DOCUMENTS

| | | | |
|---|---|---|---|
| CN | 101827306 | A | 9/2010 |
| CN | 102195955 | A | 9/2011 |
| CN | 104813691 | A | 7/2015 |
| CN | 105704762 | A | 6/2016 |
| CN | 107277554 | A | 10/2017 |
| CN | 109274634 | A | 1/2019 |
| CN | 110602750 | A | 12/2019 |
| CN | 110611613 | A | 12/2019 |
| CN | 110769471 | A | 2/2020 |
| CN | 110809244 | A | 2/2020 |
| EP | 3534646 | A1 | 9/2019 |
| WO | 2019176402 | A1 | 9/2019 |
| WO | 2020063362 | A1 | 4/2020 |

OTHER PUBLICATIONS

First Office Action issued in related Chinese Application No. 202010260659.6 mailed Mar. 31, 2022, 9 pages.

Extended European Search Report issued in related European Application No. 21780896.3, mailed Jul. 7, 2023, 10 pages.

Office Action issued in related European Application No. 21780896.3, mailed May 12, 2026, 12 pages.

* cited by examiner

TRANSMISSION TUNNEL CHANGING METHOD, ACCESS NETWORK DEVICE, AND CORE NETWORK DEVICE

CROSS-REFERENCE TO RELATED APPLICATIONS

The application is a continuation of International Application No. PCT/CN2021/085256, filed on Apr. 2, 2021, which claims priority to Chinese Patent Application No. 202010260659.6, filed on Apr. 3, 2020. The entire contents of each of the above-identified applications are expressly incorporated herein by reference.

TECHNICAL FIELD

The present disclosure relates to the communications field, and in particular, to a transmission tunnel changing method, an access network device, and a core network device.

BACKGROUND

In a related technology, a one-to-many transmission mode may be used to effectively use a mobile network resource and share a network (including a core network and an access network) resource, so as to implement services for as many users as possible with a same requirement by using as few resources as possible, for example, a Multimedia Broadcast and Multicast Service (MBMS) or a Multicast Broadcast Service (MBS).

In the MBMS or the MBS, a transmission tunnel is established between a base station and a core network entity, for example, a General Packet Radio Service (GPRS) Tunneling Protocol for User Plane (GTP-U) tunnel. An MBS service can be sent through the following types of transmission tunnels.

(1) Multicast transmit tunnel: for example, a point-to-multipoint transmit tunnel. For example, for one multicast transmit tunnel, a transmit end has one transmit tunnel identifier, and a receive end may have multiple receive tunnel identifiers, where each receive end has its own receive tunnel identifier.

(2) Unicast transmit tunnel: for example, a point-to-point transmit tunnel. For example, for one unicast transmit tunnel, a transmit end has one transmit tunnel identifier, and a receive end can have and only have one receive tunnel identifier.

For a specific service, if an MBS service transmit device of the core network converts a sending manner of a service between a unicast tunnel and a multicast tunnel, to ensure that data is sequentially sent to UE, one tunnel needs to be released before another tunnel can be established. Therefore, a relatively large data sending delay may be caused.

SUMMARY

According to a first aspect, a transmission tunnel changing method is provided and is applied to a base station, where the method includes: establishing multiple transmission tunnels for one target service; receiving data of the target service by using a source transmission tunnel, where the source transmission tunnel is one of the multiple transmission tunnels; receiving a transmission tunnel change instruction, where the transmission tunnel change instruction is used to instruct to change data transmission of the target service from the source transmission tunnel to a target transmission tunnel, and the target transmission tunnel is one of the multiple transmission tunnels; and receiving the data of the target service from the target transmission tunnel.

According to a second aspect, a transmission tunnel changing method is provided and is applied to a core network device, where the method includes: establishing multiple transmission tunnels for one target service; sending data of the target service by using a source transmission tunnel, where the source transmission tunnel is one of the multiple transmission tunnels; sending a transmission tunnel change instruction, where the transmission tunnel change instruction is used to instruct to change data transmission of the target service from the source transmission tunnel to a target transmission tunnel, and the target transmission tunnel is one of the multiple transmission tunnels; and sending the data of the target service from the target transmission tunnel.

According to a third aspect, an access network device is provided, and includes: a first establishment module, configured to establish multiple transmission tunnels for one target service; a first receiving module, configured to receive data of the target service by using a source transmission tunnel, where the source transmission tunnel is one of the multiple transmission tunnels; a second receiving module, configured to receive a transmission tunnel change instruction, where the transmission tunnel change instruction is used to instruct to change data transmission of the target service from the source transmission tunnel to a target transmission tunnel, and the target transmission tunnel is one of the multiple transmission tunnels; and a third receiving module, configured to receive the data of the target service from the target transmission tunnel.

According to a fourth aspect, a core network device is provided, and includes: a second establishment module, configured to establish multiple transmission tunnels for one target service; a first sending module, configured to send data of the target service by using a source transmission tunnel, where the source transmission tunnel is one of the multiple transmission tunnels; a second sending module, configured to send a transmission tunnel change instruction, where the transmission tunnel change instruction is used to instruct to change data transmission of the target service from the source transmission tunnel to a target transmission tunnel, and the target transmission tunnel is one of the multiple transmission tunnels; and a third sending module, configured to send the data of the target service from the target transmission tunnel.

According to a fifth aspect, an access network device is provided, and includes a processor, a memory, and a computer program that is stored in the memory and that can run on the processor, and when the computer program is executed by the processor, steps in the method provided in the first aspect are implemented.

According to a sixth aspect, a core network device is provided, and includes a processor, a memory, and a computer program that is stored in the memory and that can run on the processor, and when the computer program is executed by the processor, steps in the method provided in the second aspect are implemented.

According to a seventh aspect, a computer-readable storage medium is provided, and a computer program is stored in the computer-readable storage medium. When the computer program is executed by a processor, steps in the method provided in the first aspect or the second aspect are implemented.

BRIEF DESCRIPTION OF DRAWINGS

The accompanying drawings described herein are used to provide further understanding of the present disclosure and constitute a part of the present disclosure. The exemplary embodiments of the present disclosure and descriptions thereof are used to explain the present disclosure, and do not constitute an undue limitation on the present disclosure. In the accompanying drawings.

DETAILED DESCRIPTION

The following describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art without creative efforts fall within the protection scope of the present disclosure.

Technical solutions of the present disclosure may be applied to various communications systems, for example, a Global System of Mobile communications (GSM), a Code Division Multiple Access (CDMA) system, a Wideband Code Division Multiple Access (WCDMA), a General Packet Radio Service (GPRS), a Long Term Evolution (LTE) or Long Term Evolution Advanced (LTE-A), and New Radio (NR).

User Equipment (UE) may also be referred to as a mobile device, a mobile terminal, or mobile user equipment, and may communicate with one or more core networks by using a Radio Access Network (RAN). The user equipment may be a terminal device, such as a mobile phone (or referred to as a "cellular" phone) and a computer having a mobile terminal. For example, the user equipment may be a portable, pocket-sized, handheld, computer-built-in, or in-vehicle mobile apparatus, and exchange language and/or data with the radio access network.

A base station may be a Base Transceiver Station (BTS) in GSM or CDMA, or may be a NodeB in WCDMA, or may be an evolved NodeB (eNB or e-NodeB, evolutional Node B) and a 5G base station (gNB) in LTE. This is not limited in the present disclosure. But for ease of description, a gNB is used as an example for description in the following embodiments.

Figure 1:
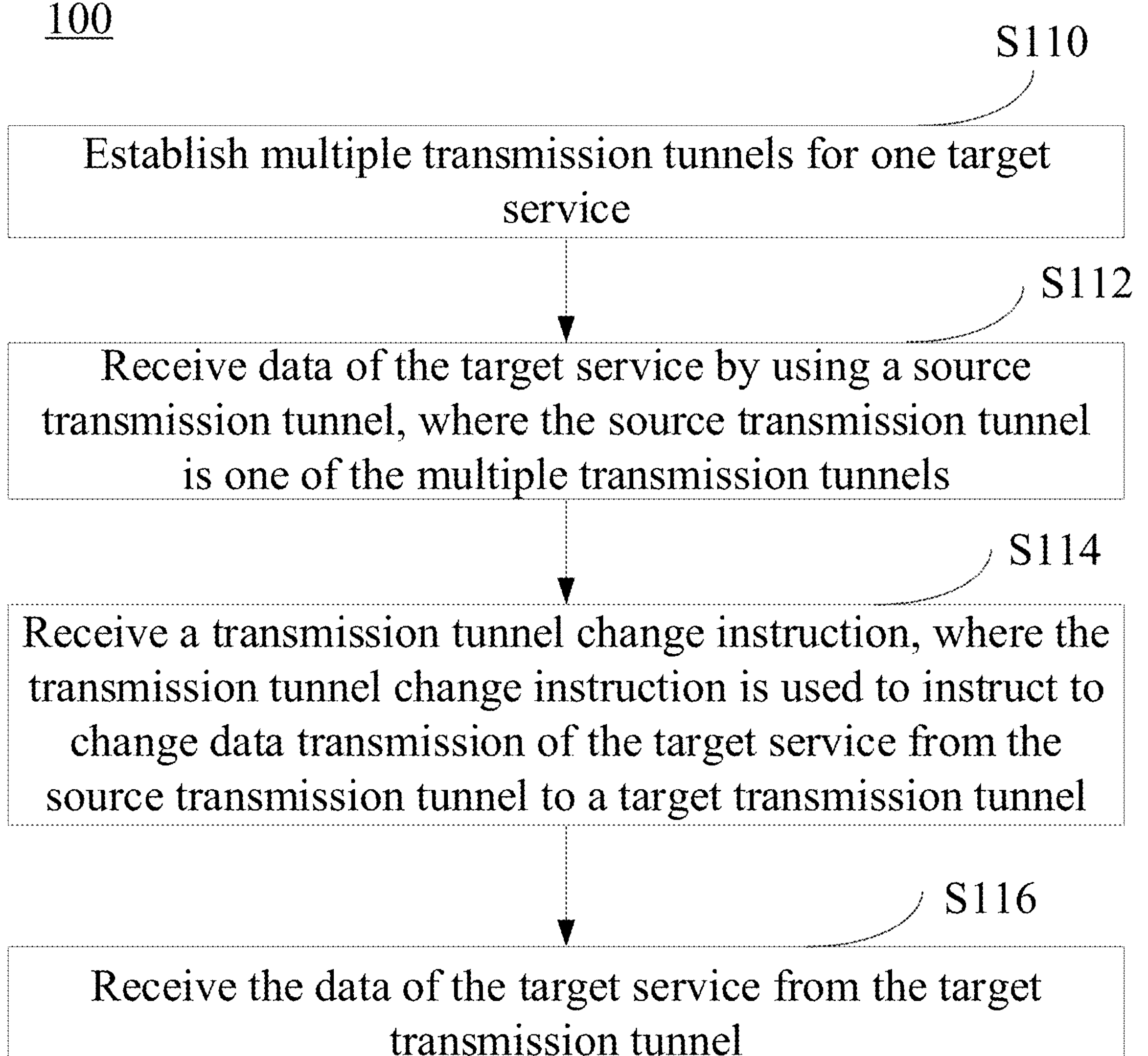
FIG. 1 is a schematic flowchart of a transmission tunnel changing method according to an embodiment of the present disclosure.

FIG. 1 is a schematic flowchart of a transmission mode conversion indication method according to an embodiment of the present disclosure. The method 100 may be performed by a base station. In other words, the method may be performed by software or hardware installed on the base station. As shown in FIG. 1, the method may include the following steps:

S110: Establish multiple transmission tunnels for one target service.

In this embodiment of the present disclosure, for data transmission of a same target service, the base station establishes multiple transmission tunnels to a core network device. For example, the base station and the core network device (for example, a User Plane Function (UPF)) simultaneously provide two transmission tunnels for an MBS service-1 (for example, a service identifier is TMGI-1), where a transmission tunnel-1 is a unicast transmission tunnel, and a transmission tunnel-2 is a multicast transmission tunnel.

In this embodiment of the present disclosure, for example, the target service may be an MBS service. Certainly, the target service is not limited thereto, or may be another service, provided that a data transmission tunnel of the service needs to be changed.

In some embodiments, if there are multiple to-be-transmitted target services between the base station and a core network, multiple transmission tunnels are established for each target service.

In this embodiment of the present disclosure, the multiple transmission tunnels may be identified by using at least one of the following, that is, identifiers of the multiple transmission tunnels may include at least one of the following:

(1) A tunnel identifier (for example, GTP-U Tunnel-1), that is, a tunnel identifier of each transmission tunnel;

(2) A Protocol Data Unit (PDU) session identifier, that is, a PDU session identifier used by each transmission tunnel to transmit the target service, for example, a PDU session-1;

(3) A service flow identifier, that is, a flow identifier of a target service transmitted on each transmission tunnel, for example, a flow ID-1.

In this embodiment of the present disclosure, the target service may be identified by using at least one of the following, that is, an identifier of the target service may include at least one of the following:

(1) A Temporary Mobile Group Identification (TMGI), that is, a TMGI corresponding to the target service.

(2) A service flow identifier, that is, an identifier of a flow for transmitting data of the target service.

(3) A service PDU session identifier, that is, an identifier of a PDU session for transmitting data of the target service.

In an implementation, to help the base station in determining a transmission tunnel corresponding to the target service, after the multiple transmission tunnels are established, a correspondence between the identifiers of the multiple transmission tunnels and the identifier of the target service may be saved.

In an implementation, the transmission tunnel may be a transmission tunnel established by the base station with the core network device via one or more transmission nodes.

For example, if a GTP Tunnel-1 is established between an MBS service server (for example, a Broadcast Multicast Service Control (BM-SC)) and a data sending node (for example, a UPF), and a GTP Tunnel-2 is established between the data sending node and the base station, the GTP Tunnel-1 and the GTP Tunnel-2 jointly constitute a transmission tunnel between the base station and the core network device (that is, the MBS service server).

For another example, if a GTP Tunnel-1 is established between an MBS service server (for example, a BM-SC) and a data sending node (for example, a UPF), a GTP Tunnel-2 is established between the data sending node and a base station 1, and a GTP Tunnel-3 is established between a base station 2 and the base station 1, the GTP Tunnel-1, the GTP Tunnel-2, and the GTP Tunnel-3 constitute a transmission tunnel between the base station 2 and the core network device (that is, the MBS service server).

In an implementation, the core network device may be a user data transit node (for example, a UPF or an MBS gateway) or a user service control node (for example, an MBS server (a BM-SC)). In other words, in this embodiment of the present disclosure, the changed transmission tunnel may be a transmission tunnel between the base station and the user data transit node, or may be a transmission tunnel between the base station and the user service control node.

S112: Receive data of the target service by using a source transmission tunnel, where the source transmission tunnel is one of the multiple transmission tunnels.

In some embodiments, when the target service needs to be transmitted, the base station establishes the multiple transmission tunnels with the core network, and then transmits the data of the target service by using one (referred to as a source transmission tunnel for ease of differentiation in this embodiment of the present disclosure) of the multiple transmission tunnels. The source transmission tunnel may be selected and notified by the core network from the multiple transmission tunnels based on a current specific application, for example, may be a multicast transmission tunnel.

S114: Receive a transmission tunnel change instruction, where the transmission tunnel change instruction is used to instruct to change data transmission of the target service from the source transmission tunnel to a target transmission tunnel, and the target transmission tunnel is one of the multiple transmission tunnels.

In this embodiment of the present disclosure, if the core network device determines to change sending of the target service from the source transmission tunnel to the target transmission tunnel, the core network device may send the transmission tunnel change instruction to the base station to change the transmission tunnel.

In an implementation, the transmission tunnel change instruction may include: a data end indication received on the source transmission tunnel, where the data end indication is used to indicate that transmission of the data of the target service on the source transmission tunnel ends. In other words, in this implementation, when the core network device determines to change sending of a service from the source transmission tunnel to the target transmission tunnel, the core network device may send a data end indication on the source transmission tunnel, to instruct the base station to end transmission of the data of the target service on the source transmission tunnel, and send subsequent data of the target service on the target transmission tunnel. For example, the base station establishes two transmission tunnels: a unicast transmission tunnel and a multicast transmission tunnel. The data of the current target service is transmitted on one (that is, the source transmission tunnel) of the transmission tunnels. The base station receives the data end indication on the source transmission tunnel, and may determine that the data of the target service is no longer transmitted on the source transmission tunnel, but is changed to another transmission tunnel (that is, the target transmission tunnel) for transmission.

In another implementation, the transmission tunnel change instruction may alternatively include: a data start indication received on the target transmission tunnel, where the data start indication is used to indicate that transmission of the data of the target service on the target transmission tunnel starts. In other words, in this implementation, when the core network device determines to change sending of a service from the source transmission tunnel to the target transmission tunnel, the core network device may send a data start indication on the target transmission tunnel, to notify the base station that transmission of the data of the target service on the target transmission tunnel starts. After receiving the indication, the base station may determine that the data of the target service has been changed to the target transmission tunnel for transmission.

S116: Receive the data of the target service from the target transmission tunnel.

In this embodiment of the present disclosure, after sending the transmission tunnel change instruction (for example, the foregoing data end indication sent on the source transmission tunnel or the data start indication sent on the target transmission tunnel), the core network device may send the data of the target service on the target transmission tunnel, and the base station receives the data of the target service sent on the target transmission tunnel.

In an implementation, after S114, after sending a first data packet to a terminal device, the base station may send a second data packet to the terminal device, where the first data packet is a data packet of the target service received from the source transmission tunnel before the transmission tunnel change instruction is received, and the second data packet is a data packet of the target service received from the target transmission tunnel. In other words, when receiving a data packet of the target service by using the target transmission tunnel, the base station does not immediately send the data packet to the terminal device, but caches the data packet. Before the transmission tunnel change instruction, the target data received from the source transmission tunnel is sent to the terminal device, and then the cached data packet received from the target transmission tunnel is sent to the terminal device. In this implementation, data packets of the target service sent by the base station to the terminal device are continuous data packets.

In another implementation, after S114, the base station may send the first data packet and the second data packet to the terminal device simultaneously, where the first data packet is a data packet of the target service received from the source transmission tunnel, and the second data packet is a data packet of the target service received from the target transmission tunnel. In other words, in this possible implementation, after receiving the first data packet and the second data packet, the base station sends the first data packet and the second data packet to the terminal device.

In some implementations, after S114, the base station may further generate and send a data end indication to the terminal device according to the transmission tunnel change instruction, to indicate an end location of the data packet received from the source transmission tunnel. For example, the base station may determine, according to the data end indication received on the source transmission tunnel, an end location of the data packet received on the source transmission tunnel. To enable the terminal device to obtain continuous data, the end location is indicated to the terminal device, so that the terminal device can splice received data packets.

For example, the base station simultaneously sends a received data packet by using a transmission tunnel Tunnel-1 over an air interface by using a Data Radio Bearer (DRB)-1, and sends the received data packet by using a transmission tunnel Tunnel-2 over the air interface by using an MBS Radio Bearer (MRB)-2. After the core network stops sending the data packet by using the Tunnel-1, the core network sends a data end indication to indicate that a data packet 5 is an end data packet of the Tunnel-1. The base station receives the data end indication, and also sends the data end indication in the DRB-1 to indicate that the data packet 5 (for example, a PDCP SN number is 5) is an end data packet of the DRB-1.

In an implementation, to save transmission resources, after S114, the method may further include: releasing the source transmission tunnel. For example, after receiving the data end indication on the source transmission tunnel, the base station releases the data transmission tunnel corresponding to the data end indication. In this implementation, the source transmission tunnel may be released in a timely manner, to save transmission resources.

Figure 2:
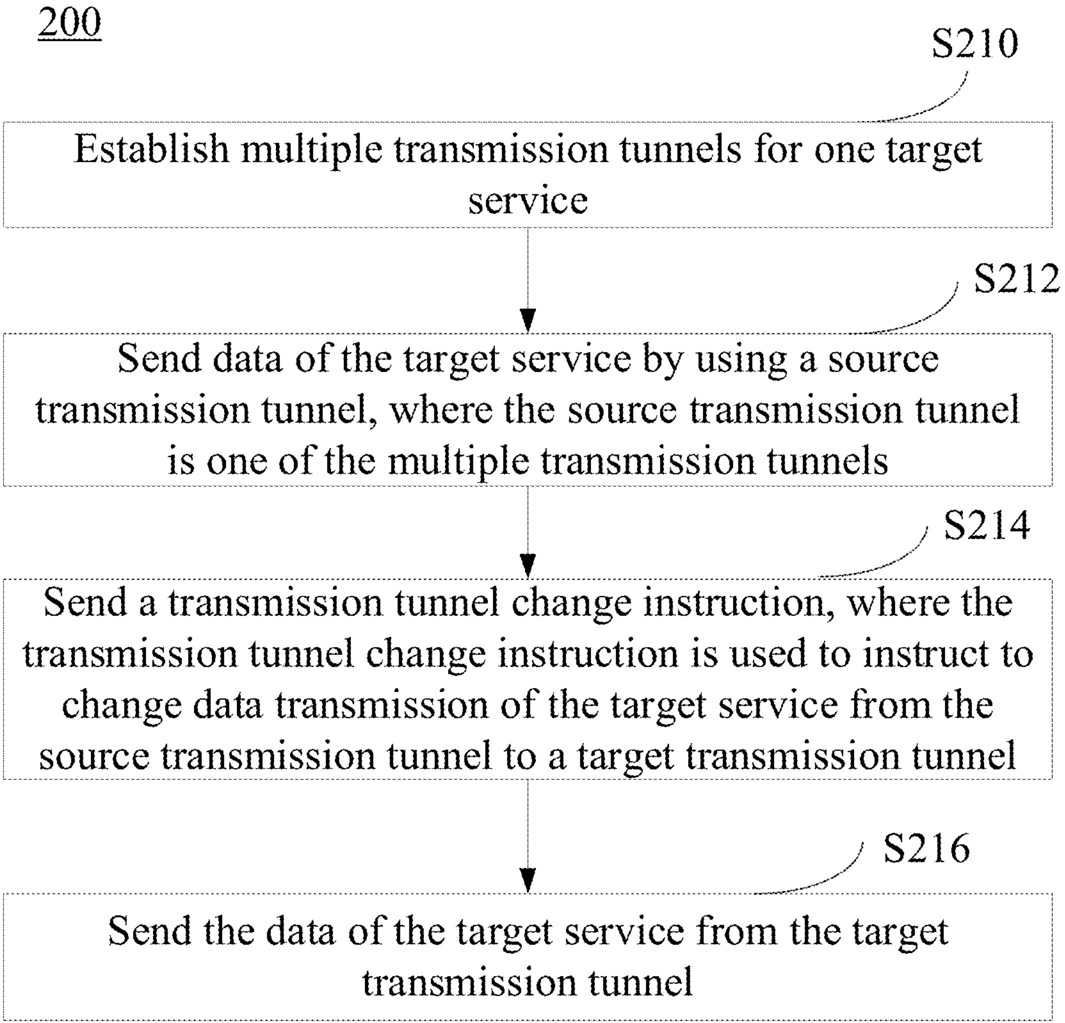
FIG. 2 is another schematic flowchart of a transmission tunnel changing method according to an embodiment of the present disclosure.

FIG. 2 is another schematic flowchart of a transmission tunnel changing method according to an embodiment of the present disclosure. The method 200 may be performed by a core network device. In other words, the method may be performed by software or hardware installed on the core network device. As described in the foregoing method 100, the core network device may include a user data transit node or a user service control node.

As shown in FIG. 2, the method may include the following steps:

S210: Establish multiple transmission tunnels for one target service.

This step corresponds to S110 in the method 100. For details, refer to related descriptions in the method 100. Details are not described herein again.

In this embodiment of the present disclosure, the target service may include but is not limited to an MBMS service.

In this embodiment of the present disclosure, corresponding to the method 100, a type of any one of the multiple transmission tunnels established in S210 may include a unicast transmission tunnel or a multicast transmission tunnel.

In this embodiment of the present disclosure, corresponding to the method 100, identifiers of the multiple transmission tunnels include at least one of the following: a tunnel identifier, an MBS service PDU session identifier, and an MBS service flow identifier.

In an implementation, the identifiers of the multiple transmission tunnels include at least one of the following: a tunnel identifier, a service PDU session identifier, and a service flow identifier. For details, reference may be made to related descriptions in the method 100. Details are not described herein again.

In an implementation, an identifier of the target service includes at least one of the following: a Temporary Mobile Group Identifier (TMGI), a service flow identifier, and a service Protocol Data Unit (PDU) session identifier. For details, reference may be made to related descriptions in the method 100. Details are not described herein again.

In an implementation, to enable the core network device to identify multiple transmission tunnels corresponding to each target service, after S210, the method further includes: storing a correspondence between identifiers of the multiple transmission tunnels and an identifier of the target service.

S212: Send data of the target service by using a source transmission tunnel, where the source transmission tunnel is one of the multiple transmission tunnels.

This step corresponds to S112 in the method 100, and details are not described herein again.

S214: Send a transmission tunnel change instruction, where the transmission tunnel change instruction is used to instruct to change data transmission of the target service from the source transmission tunnel to a target transmission tunnel, and the target transmission tunnel is one of the multiple transmission tunnels.

In some embodiments, if the core network device determines to change a transmission tunnel of the target service, the transmission tunnel change instruction may be sent to change the transmission tunnel of the target service.

In an implementation, the transmission tunnel change instruction may include: a data end indication sent on the source transmission tunnel, where the data end indication is used to indicate that sending of the data of the target service on the source transmission tunnel ends. In other words, when determining to change the transmission tunnel of the target service, the core network device may send a data end indication on the source transmission tunnel, to indicate that data transmission on the source transmission tunnel ends, and subsequent data of the target service is transmitted on the target transmission tunnel. For details, refer to related descriptions in the method 100.

In another implementation, the transmission tunnel change instruction may include: a data start indication sent on the target transmission tunnel, where the data start indication is used to indicate that sending of the data of the target service on the target transmission tunnel starts. In other words, when determining to change a transmission tunnel of the target service, the core network device may send a data start indication on the target transmission tunnel, to instruct to data transmission of the target service on the target transmission tunnel starts, and stop transmitting the data of the target service on the source transmission tunnel. For details, refer to related descriptions in the method 100.

S216: Send the data of the target service from the target transmission tunnel.

This step corresponds to S116 in the method 100.

In an implementation, after the transmission tunnel change instruction is sent, data does not need to be sent on the source transmission tunnel. Therefore, to save transmission resources, after S214, the source transmission tunnel is released. For example, after sending the data end indication, the core network device releases a data transmission tunnel corresponding to the data end indication, for example, deletes identification information configured for the data transmission tunnel.

Figure 3:
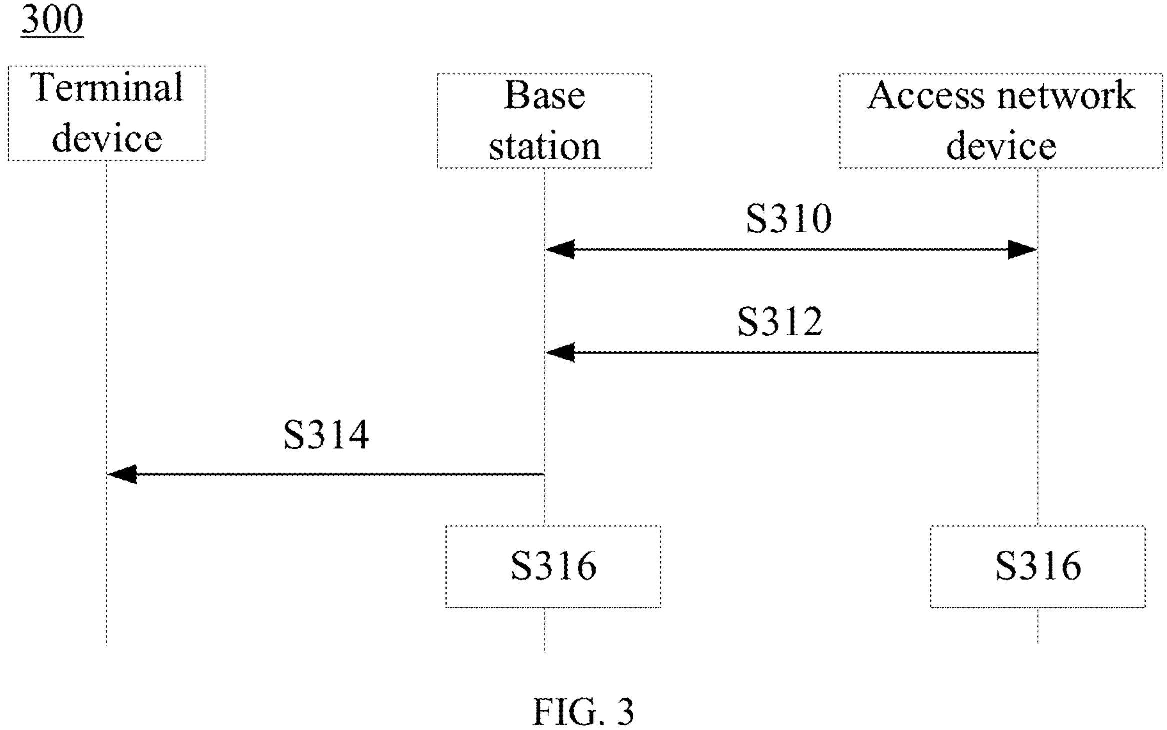
FIG. 3 is still another schematic flowchart of a transmission tunnel changing method according to an embodiment of the present disclosure.

FIG. 3 is still another schematic flowchart of a transmission tunnel changing method according to an embodiment of the present disclosure. The method 300 may be performed by a base station and a core network device. In other words, the method may be performed by software or hardware installed on the base station and the core network device. As shown in FIG. 3, the method may include the following steps:

S310: The base station and the core network device establish multiple transmission tunnels for receiving of data of a same MBS service.

For example, the base station and the core network device (for example, a UPF) simultaneously provide two transmission tunnels for an MBS service-1 (for example, a TMGI-1), where a transmission tunnel 1 is a unicast transmission tunnel, and a transmission tunnel-2 is a multicast transmission tunnel.

An identifier of the transmission tunnel includes at least one of the following: a tunnel identifier (for example, a GTP-U Tunnel-1), an MBS service PDU session identifier (for example, a PDU session-1), and an MBS service flow identifier (such as a flow ID-1).

Identifiers of MBS services corresponding to the multiple transmission tunnels include at least one of the following: a TMGI, an MBS service flow identifier (not applicable to a case in which only an "MBS service flow identifier" is used to identify different transmission tunnels), and an MBS service PDU session identifier (not applicable to a case in which only an "MBS service PDU session identifier" is used to identify different transmission tunnels).

The transmission tunnel may be a transmission tunnel established between the core network device and the base station after the core network device passes through multiple transmission nodes. For example, if a GTP Tunnel-1 is established between an MBS service server (for example, a BM-SC) and a data sending node (for example, a UPF), and a GTP Tunnel-2 is established between the data sending node and the base station, the GTP Tunnel-1 and the GTP Tunnel-2 jointly constitute a transmission tunnel between the base station and a core network. For another example, if a GTP Tunnel-1 is established between an MBS service server (for example, a BM-SC) and a data sending node (for example, a UPF), a GTP Tunnel-2 is established between the data sending node and a base station 1, and a GTP Tunnel-3 is established between a base station 2 and the base station 1, the GTP Tunnel-1, the GTP Tunnel-2, and the GTP Tunnel-3 constitute a transmission tunnel between the base station 2 and a core network.

The core network device may include at least one of the following: a user data transit node (for example, a UPF or an MBS gateway) and a user service control node (for example, an MBS server (a BM-SC)). In other words, in this embodiment of the present disclosure, a transmission tunnel between the user data transit node and the base station may be changed, or a transmission tunnel between the user service control node and the base station may be changed.

S312: The core network device determines to change sending of a specific service (for example, a TMGI-1) from a source transmission tunnel to a target transmission tunnel. For the specific service, the core network device sends a data end indication to the base station on the source transmission tunnel.

S314: After receiving the end indication, the base station sends a received data packet of the specific service to the terminal device over an air interface.

In S314, the data packet of the specific service may be sent to the terminal device in the following two manners.

Manner 1: Simultaneously send a data packet of the source transmission tunnel and a data packet of the target transmission tunnel over the air interface.

Manner 2: First send, over the air interface, a data packet received from the source transmission tunnel before the data end indication, and then send, over the air interface, a data packet received from the target transmission tunnel.

In the foregoing manner, for example, after S312, the base station may generate an air interface according to the received data end indication, to send the data end indication for the data packet. For example, a data packet of the Tunnel-1 of the base station is sent on the air interface by using a DRB-1, and a data packet of the Tunnel-2 of the base station is sent on the air interface by using an MRB-2. After the core network stops sending the data packet by using the Tunnel-1, the core network sends a data end indication to indicate that a data packet 5 is an end data packet of the Tunnel-1. The base station receives the data end indication, and also sends the data end indication in the DRB-1 to indicate that the data packet 5 (for example, a PDCP SN number is 5) is an end data packet of the DRB-1.

S316: After sending the data end indication, the core network device releases a data transmission tunnel corresponding to the data end indication. After sending the data end indication, the base station releases a data transmission tunnel corresponding to the data end indication.

Figure 4:
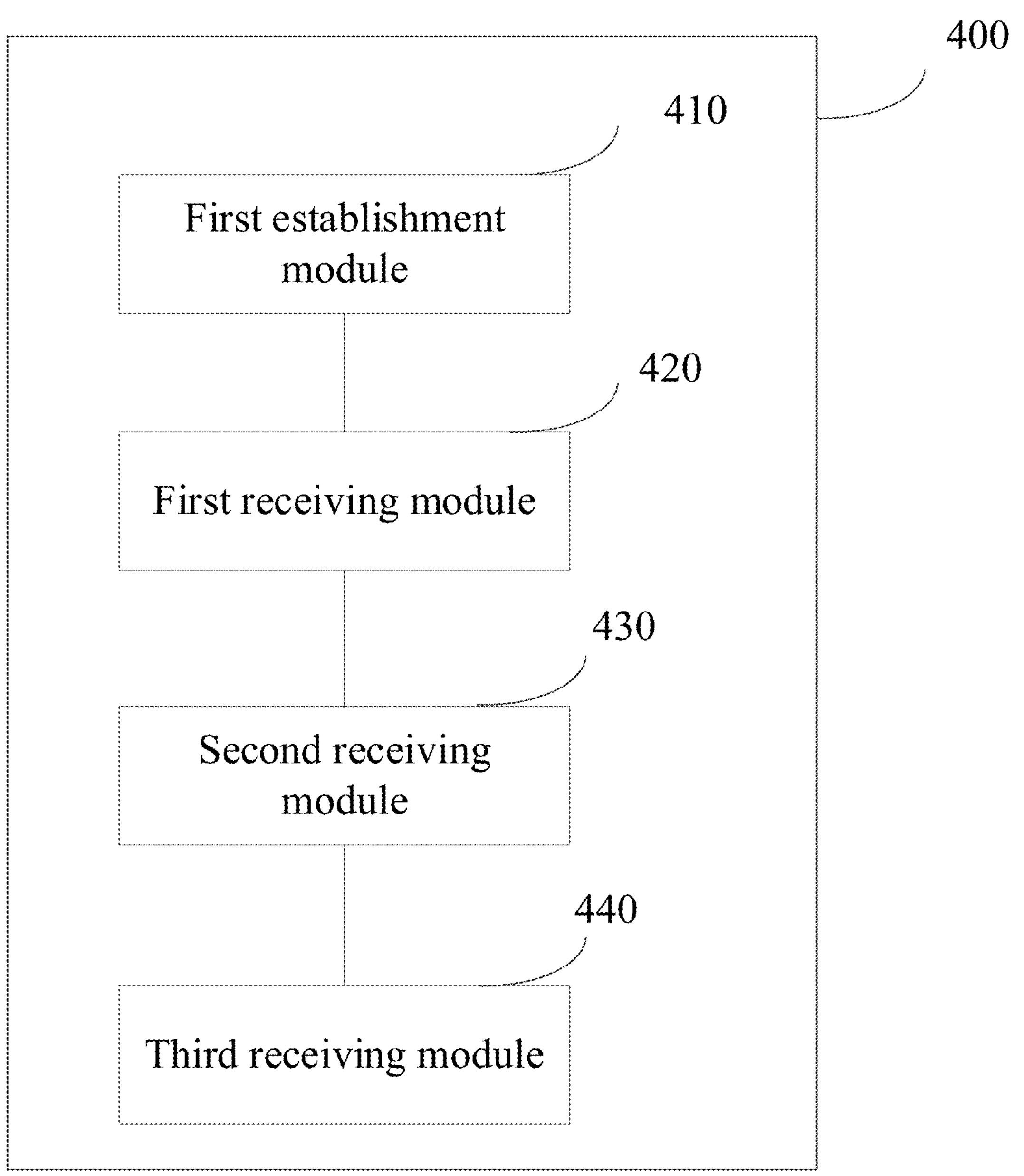
FIG. 4 is a schematic diagram of a structure of an access network device according to an embodiment of the present disclosure.

FIG. 4 is a schematic diagram of a structure of an access network device according to an embodiment of the present disclosure. As shown in FIG. 4, the access network device 400 includes: a first establishment module 410, configured to establish multiple transmission tunnels for one target service; a first receiving module 420, configured to receive data of the target service by using a source transmission tunnel, where the source transmission tunnel is one of the multiple transmission tunnels; a second receiving module 430, configured to receive a transmission tunnel change instruction, where the transmission tunnel change instruction is used to instruct to change data transmission of the target service from the source transmission tunnel to a target transmission tunnel, and the target transmission tunnel is one of the multiple transmission tunnels; and a third receiving module 440, configured to receive the data of the target service from the target transmission tunnel. In an implementation, the first message carries mode information, or the second message carries mode information, where the mode information is used to indicate a transmission mode of multicast service data.

In an implementation, a type of any one of the multiple transmission tunnels includes a unicast transmission tunnel or a multicast transmission tunnel.

In an implementation, a storage module is further included and is configured to: after the multiple transmission tunnels are established with a core network device, store a correspondence between identifiers of the multiple transmission tunnels and an identifier of the target service.

In an implementation, the identifiers of the multiple transmission tunnels include at least one of the following: a tunnel identifier, a service PDU session identifier, and a service flow identifier.

In an implementation, the identifier of the target service includes at least one of the following: a TMGI, a service flow identifier, and a service PDU session identifier.

In an implementation, the multiple transmission tunnels are transmission tunnels established by the base station with the core network device via one or more transmission nodes.

In an implementation, the core network device includes a user data transit node or a user service control node.

In an implementation, the transmission tunnel change instruction included at least one of the following: a data end indication received on the source transmission tunnel, where the data end indication is used to indicate that transmission of the data of the target service on the source transmission tunnel ends; and a data start indication received on the target transmission tunnel, where the data start indication is used to indicate that transmission of the data of the target service on the target transmission tunnel starts.

In an implementation, a first sending module is further included, and is configured to: after receiving the transmission tunnel change instruction, send a first data packet to a terminal device, and then send a second data packet to the terminal device, where the first data packet is a data packet of the target service received from the source transmission tunnel before receiving the transmission tunnel change instruction, and the second data packet is a data packet of the target service received from the target transmission tunnel; or send the first data packet and the second data packet to the terminal device simultaneously, where the first data packet is a data packet of the target service received from the source transmission tunnel, and the second data packet is a data packet of the target service received from the target transmission tunnel.

In an implementation, a second sending module is further included, and is configured to: after receiving the transmission tunnel change indication, generate and send a data end indication to the terminal device according to the transmission tunnel change indication, to indicate an end location of a data packet received from the source transmission tunnel.

In an implementation, a releasing module is further included, and is configured to release the source transmission tunnel after receiving the transmission tunnel change instruction.

The access network device provided in this embodiment of the present disclosure can implement processes implemented by the base station in the method embodiments in FIG. 1 to FIG. 3, and a same effect is implemented. To avoid repetition, details are not described herein again.

Figure 5:
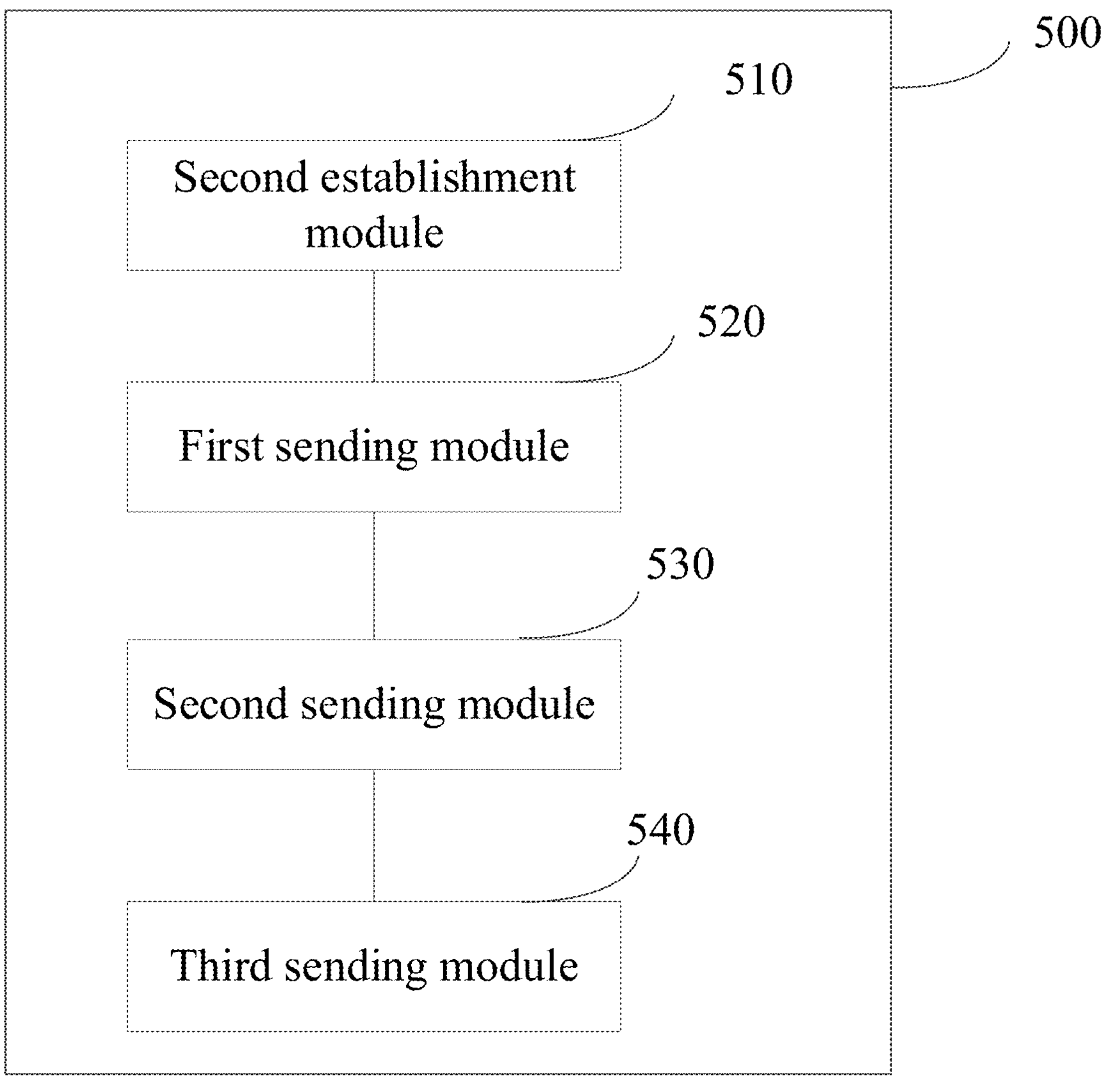
FIG. 5 is a schematic diagram of a structure of a core network device according to an embodiment of the present disclosure.

FIG. 5 is a schematic diagram of a structure of a core network device according to an embodiment of the present disclosure. As shown in FIG. 5, the core network device 500 includes: a second establishment module 510, configured to establish multiple transmission tunnels for one target service; a second sending module 520, configured to send data of the target service by using a source transmission tunnel, where the source transmission tunnel is one of the multiple transmission tunnels; a second sending module 530, configured to send a transmission tunnel change instruction, where the transmission tunnel change instruction is used to instruct to change data transmission of the target service from the source transmission tunnel to a target transmission tunnel, and the target transmission tunnel is one of the multiple transmission tunnels; and a third sending module 540, configured to send the data of the target service from the target transmission tunnel.

In an implementation, a type of any one of the multiple transmission tunnels includes a unicast transmission tunnel or a multicast transmission tunnel.

In an implementation, a storage module is further included, and is configured to: after the multiple transmission tunnels are established, store a correspondence between identifiers of the multiple transmission tunnels and an identifier of the target service.

In an implementation, the identifiers of the multiple transmission tunnels include at least one of the following: a tunnel identifier, a service PDU session identifier, and a service flow identifier.

In an implementation, the identifier of the target service includes at least one of the following: a TMGI, a service flow identifier, and a service PDU session identifier.

In an implementation, the transmission tunnel change instruction included at least one of the following: a data end indication sent on the source transmission tunnel, where the data end indication is used to indicate that sending of the data of the target service on the source transmission tunnel ends; and a data start indication sent on the target transmission tunnel, where the data start indication is used to indicate that sending of the data of the target service on the target transmission tunnel starts.

In an implementation, a releasing module may be further included, and is configured to release the source transmission tunnel after sending the transmission tunnel change instruction.

The core network device provided in this embodiment of the present disclosure can implement processes implemented by the core network device in the method embodiments in FIG. 1 to FIG. 3, and a same effect is implemented. To avoid repetition, details are not described herein again.

Figure 6:
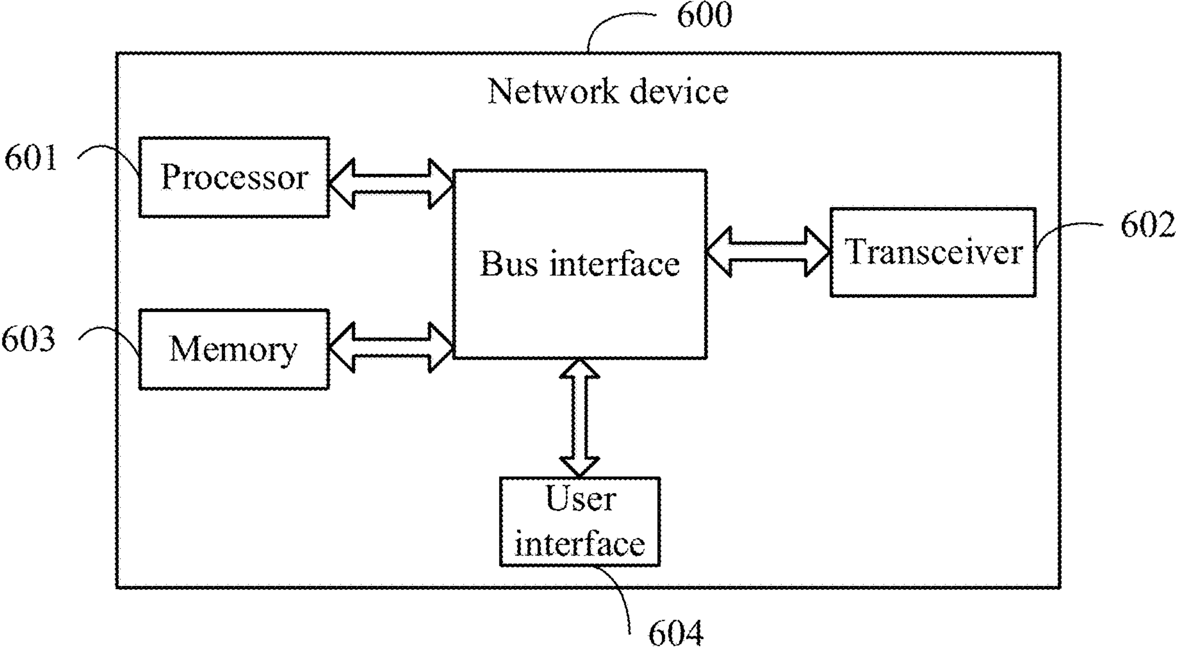
FIG. 6 is a schematic diagram of a structure of a network device according to an embodiment of the present disclosure.

As shown in FIG. 6, FIG. 6 is a diagram of a structure of a network device to which an embodiment of the present disclosure is applied. The network device can be used as a base station or a core network to implement details in the methods 100 to 300, and achieve a same effect. As shown in FIG. 6, a network device 600 includes a processor 601, a transceiver 602, a memory 603, a user interface 604, and a bus interface.

In this embodiment of the present disclosure, the network device 600 further includes a computer program that is stored in the memory 603 and that can run on the processor 601. When the computer program is executed by the processor 601, the following steps are implemented:

establishing multiple transmission tunnels for one target service; receiving data of the target service by using a source transmission tunnel, where the source transmission tunnel is one of the multiple transmission tunnels;

receiving a transmission tunnel change instruction, where the transmission tunnel change instruction is used to instruct to change data transmission of the target service from the source transmission tunnel to a target transmission tunnel, and the target transmission tunnel is one of the multiple transmission tunnels; and receiving the data of the target service from the target transmission tunnel.

In some embodiments, when the computer program is executed by the processor 601, the following steps may be implemented:

establishing multiple transmission tunnels for one target service;

sending data of the target service by using a source transmission tunnel, where the source transmission tunnel is one of the multiple transmission tunnels;

sending a transmission tunnel change instruction, where the transmission tunnel change instruction is used to instruct to change data transmission of the target service from the source transmission tunnel to a target transmission tunnel, and the target transmission tunnel is one of the multiple transmission tunnels; and sending the data of the target service from the target transmission tunnel.

In FIG. 6, a bus architecture may include any quantity of interconnected buses and bridges, and is specifically linked by various circuits of one or more processors represented by the processor 601 and a memory represented by the memory 603. The bus architecture may further link various other circuits such as a peripheral device, a voltage regulator, and a power management circuit together. These are all well-known in the art, and therefore are not further described in this specification. The bus interface provides interfaces. The transceiver 602 may be multiple elements, in other words, includes a transmitter and a receiver, and provides a unit configured to communicate with various other apparatuses on a transmission medium. For different user equipment, the user interface 604 may further be an interface that can be externally or internally connected to a required device. The connected device includes but is not limited to a keypad, a display, a loudspeaker, a microphone, a joystick, and the like.

The processor 601 is responsible for managing the bus architecture and common processing, and the memory 603 may store data used when the processor 601 performs an operation.

The network device 600 can implement processes implemented by the base station or the core network device in FIG. 1 to FIG. 3, and a same effect can be achieved. To avoid repetition, details are not described herein.

An embodiment of the present disclosure further provides a computer-readable storage medium. A computer program is stored in the computer-readable storage medium. When being executed by a processor, the processor performs processes performed by the base station or the core network device in the embodiments shown in FIG. 1 to FIG. 3, and a same technical effect can be achieved. To avoid repetition, details are not described herein. The computer-readable storage medium includes a Read-Only Memory (ROM), a Random Access Memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The invention claimed is:

1. A transmission tunnel changing method, performed by a base station, wherein the method comprises:

establishing multiple transmission tunnels for a target service, wherein the multiple transmission tunnels are available concurrently for data transmission;

receiving data of the target service by using a source transmission tunnel, wherein the source transmission tunnel is one of the multiple transmission tunnels;

receiving a transmission tunnel change instruction, wherein the transmission tunnel change instruction is used to instruct to change data transmission of the target service from the source transmission tunnel to a target transmission tunnel, and the target transmission tunnel is another one of the multiple transmission tunnels; and receiving the data of the target service from the target transmission tunnel, wherein receiving the transmission tunnel change instruction comprises:

receiving, by the base station, a data start indication on the target transmission tunnel from a core network device, wherein the data start indication is used to indicate that transmission of the data of the target service on the target transmission tunnel starts.

2. The method according to claim 1, wherein a type of any one of the multiple transmission tunnels comprises a unicast transmission tunnel or a multicast transmission tunnel.

3. The method according to claim 1, wherein after the establishing multiple transmission tunnels, the method further comprises:

storing a correspondence between identifiers of the multiple transmission tunnels and an identifier of the target service.

4. The method according to claim 3, wherein the identifiers of the multiple transmission tunnels comprise at least one of the following: a tunnel identifier, a service Protocol Data Unit (PDU) session identifier, or a service flow identifier.

5. The method according to claim 3, wherein the identifier of the target service comprises at least one of the following: a Temporary Mobile Group Identifier (TMGI), a service flow identifier, or a service Protocol Data Unit (PDU) session identifier.

6. The method according to claim 1, wherein the multiple transmission tunnels are transmission tunnels established by the base station with the core network device via one or more transmission nodes.

7. The method according to claim 6, wherein the core network device comprises a user data transit node or a user service control node.

8. The method according to claim 1, wherein the transmission tunnel change instruction further comprises:

a data end indication received on the source transmission tunnel, wherein the data end indication is used to indicate that transmission of the data of the target service on the source transmission tunnel ends.

9. The method according to claim 1, wherein after receiving the transmission tunnel change instruction, the method comprises:

caching a second data packet on the base station, sending a first data packet to a terminal device, and after sending the first data packet to the terminal device, sending the cached second data packet to the terminal device, wherein the first data packet is a data packet of the target service received from the source transmission tunnel before the transmission tunnel change instruction is received, and the second data packet is a data packet of the target service received from the target transmission tunnel; or sending the first data packet and the second data packet to the terminal device simultaneously, wherein the first data packet is the data packet of the target service received from the source transmission tunnel, and the second data packet is the data packet of the target service received from the target transmission tunnel.

10. The method according to claim 9, wherein after the receiving a transmission tunnel change instruction, the method comprises:

generating and sending a data end indication to the terminal device according to the transmission tunnel change instruction, to indicate an end location of the first data packet received from the source transmission tunnel.

11. The method according to claim 1, wherein after the receiving a transmission tunnel change instruction, the method comprises:

releasing the source transmission tunnel.

12. A transmission tunnel changing method, performed by a core network device, wherein the method comprises:

establishing multiple transmission tunnels for a target service, wherein the multiple transmission tunnels are available concurrently for data transmission;

sending data of the target service by using a source transmission tunnel, wherein the source transmission tunnel is one of the multiple transmission tunnels;

sending a transmission tunnel change instruction, wherein the transmission tunnel change instruction is used to instruct to change data transmission of the target service from the source transmission tunnel to a target transmission tunnel, and the target transmission tunnel is another one of the multiple transmission tunnels; and sending the data of the target service from the target transmission tunnel, wherein sending the transmission tunnel change instruction comprises:

sending, by the core network device, a data start indication on the target transmission tunnel to a base station, wherein the data start indication is used to indicate that transmission of the data of the target service on the target transmission tunnel starts.

13. The method according to claim 12, wherein a type of any one of the multiple transmission tunnels comprises a unicast transmission tunnel or a multicast transmission tunnel.

14. The method according to claim 12, wherein after the establishing multiple transmission tunnels, the method further comprises:

storing a correspondence between identifiers of the multiple transmission tunnels and an identifier of the target service.

15. The method according to claim 14, wherein the identifiers of the multiple transmission tunnels comprise at least one of the following: a tunnel identifier, a service Protocol Data Unit (PDU) session identifier, or a service flow identifier.

16. The method according to claim 14, wherein the identifier of the target service comprises at least one of the following: a Temporary Mobile Group Identifier (TMGI), a service flow identifier, and a service Protocol Data Unit (PDU) session identifier.

17. The method according to claim 12, wherein the transmission tunnel change instruction further comprises:

a data end indication sent on the source transmission tunnel, wherein the data end indication is used to indicate that sending of the data of the target service on the source transmission tunnel ends.

18. The method according to claim 12, wherein after the sending a transmission tunnel change instruction, the method further comprises:

releasing the source transmission tunnel.

19. An access network device, comprising:

a memory storing computer-readable instructions; and a processor coupled to the memory and configured to execute the computer-readable instructions, wherein the computer-readable instructions, when executed by the processor, cause the processor to perform operations comprising:

establishing multiple transmission tunnels for a target service, wherein the multiple transmission tunnels are available concurrently for data transmission;

receiving data of the target service by using a source transmission tunnel, wherein the source transmission tunnel is one of the multiple transmission tunnels;

receiving a transmission tunnel change instruction, wherein the transmission tunnel change instruction is used to instruct to change data transmission of the target service from the source transmission tunnel to a target transmission tunnel, and the target transmission tunnel is another one of the multiple transmission tunnels; and receiving the data of the target service from the target transmission tunnel, wherein receiving the transmission tunnel change instruction comprises:

receiving, by the access network device, a data start indication on the target transmission tunnel from a core network device, wherein the data start indication is used to indicate that transmission of the data of the target service on the target transmission tunnel starts.

20. A core network device, comprising: a memory, a processor, and a computer program that is stored in the memory and that is configured to be run on the processor, wherein when the computer program is executed by the processor, steps in the method according to claim 12 are implemented.

* * * * *